(12) United States Patent
Toyoda et al.

(10) Patent No.: US 7,280,142 B2
(45) Date of Patent: Oct. 9, 2007

(54) DEFECTIVE PIXEL DETECTION AND CORRECTION APPARATUS USING TARGET PIXEL AND ADJACENT PIXEL DATA

(75) Inventors: Keiji Toyoda, Hamamatsu (JP); Yuichiro Sugioka, Shimada (JP); Masaki Kariya, Yokohama (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 593 days.

(21) Appl. No.: 10/256,811

(22) Filed: Sep. 27, 2002

(65) Prior Publication Data
US 2003/0063202 A1 Apr. 3, 2003

(30) Foreign Application Priority Data
Sep. 28, 2001 (JP) ............... P. 2001-301643

(51) Int. Cl.
H04N 9/64 (2006.01)
H04N 3/14 (2006.01)
H04N 5/335 (2006.01)
H04N 9/04 (2006.01)
H04N 9/083 (2006.01)

(52) U.S. Cl. .............. 348/246; 348/243; 348/273
(58) Field of Classification Search ........... 348/243, 348/246, 247, 273, 279
See application file for complete search history.

(56) References Cited
U.S. PATENT DOCUMENTS
5,327,246 A * 7/1994 Suzuki ............... 348/246
6,765,614 B1 * 7/2004 Matsukawa .......... 348/246

FOREIGN PATENT DOCUMENTS
| CN | 1248857 | 3/2000 |
|---|---|---|
| JP | 5-41868 | 2/1993 |
| JP | 2000-059799 | 2/2000 |
| JP | 2001-111893 | 4/2001 |

* cited by examiner

Primary Examiner—Vivek Srivastava
Assistant Examiner—Dan Pasiewicz
(74) Attorney, Agent, or Firm—Pearne & Gordon LLP (57) ABSTRACT

A solid-state imaging apparatus includes: a defective pixel detector (8) for extracting, from a signal output by a frame-reading solid-state image pickup element (2), pixel data for a target pixel for which a determination is to be made and pixel data for peripheral pixels thereof, and for employing pixel data for a pixel, selected from among the peripheral pixels, in the same filter as the target pixel, to determine whether the target pixel is a defective pixel; and a defective pixel correction circuit (9) for employing the pixel data for the peripheral pixels to correct pixel data for the defective pixel. With this configuration, the output signal of the defective pixel can be corrected without spreading the effect produced by the defective pixel to the peripheral pixels, and a natural image can be displayed.

12 Claims, 6 Drawing Sheets

SIGNALS OUTPUT BY INDIVIDUAL SECTIONS WHEN DATA FOR THE FOURTH LINE IS OUTPUT AS SIGNAL (a)

| | | | | | | |
|---|---|---|---|---|---|---|
| SIGNAL (j) | | $M\alpha2$ | $G\beta2$ | $M\gamma2$ | $G\delta2$ | |
| SIGNAL (f) | $C\alpha1$ | $Y\beta1$ | $C\gamma1$ | $Y\delta1$ | | |
| SIGNAL (k) | | $Y\beta1+M\alpha2$ | $C\gamma1+G\beta2$ | $Y\delta1+M\gamma2$ | | |
| SIGNAL (m) | | $Y\beta1+M\alpha2$ | $C\gamma1+G\beta2$ | $Y\delta1+M\gamma2$ | | |
| SIGNAL (n) | | $Y\beta1+M\alpha2$ | $C\gamma1+G\beta2$ | $Y\delta1+M\gamma2$ | | |

FIG. 5B

SIGNALS OUTPUT BY INDIVIDUAL SECTIONS WHEN DATA FOR THE THIRD LINE IS OUTPUT AS SIGNAL (a)

| | | | | | | |
|---|---|---|---|---|---|---|
| SIGNAL (j) | | $C\alpha3$ | $Y\beta3$ | $C\gamma3$ | $Y\delta3$ | |
| SIGNAL (f) | $M\alpha2$ | $G\beta2$ | $M\gamma2$ | $G\delta2$ | | |
| SIGNAL (k) | | $C\alpha3+G\beta2$ | $Y\beta3+M\gamma2$ | $C\gamma3+G\delta2$ | | |
| SIGNAL (m) | | $C\alpha3+G\beta2$ | $Y\beta3+M\gamma2$ | $C\gamma3+G\delta2$ | | |
| SIGNAL (n) | | $C\alpha3+G\beta2$ | $Y\beta3+M\gamma2$ | $C\gamma3+G\delta2$ | | |

FIG. 6

| a1 | A | a2 | B | a3 | C | a4 |
|----|---|----|---|----|---|----|
| b1 | c1 | b2 | c2 | b3 | c3 | b4 |
| a5 | D | a6 | E | a7 | F | a8 |
| b5 | c5 | b6 | c6 | b7 | c7 | b8 |

FIG. 7A

EDGE

FIG. 7B

DEFECTIVE PIXEL

DEFECTIVE PIXEL DETECTION AND CORRECTION APPARATUS USING TARGET PIXEL AND ADJACENT PIXEL DATA

BACKGROUND OF THE INVENTION

The present invention relates to a solid-state imaging apparatus having a solid-state image pickup element used for a video camera, and relates in particular to a solid-state imaging apparatus having a correction device for correcting a signal that is output by a solid-state image pickup element for a defective pixel.

Figure 10:
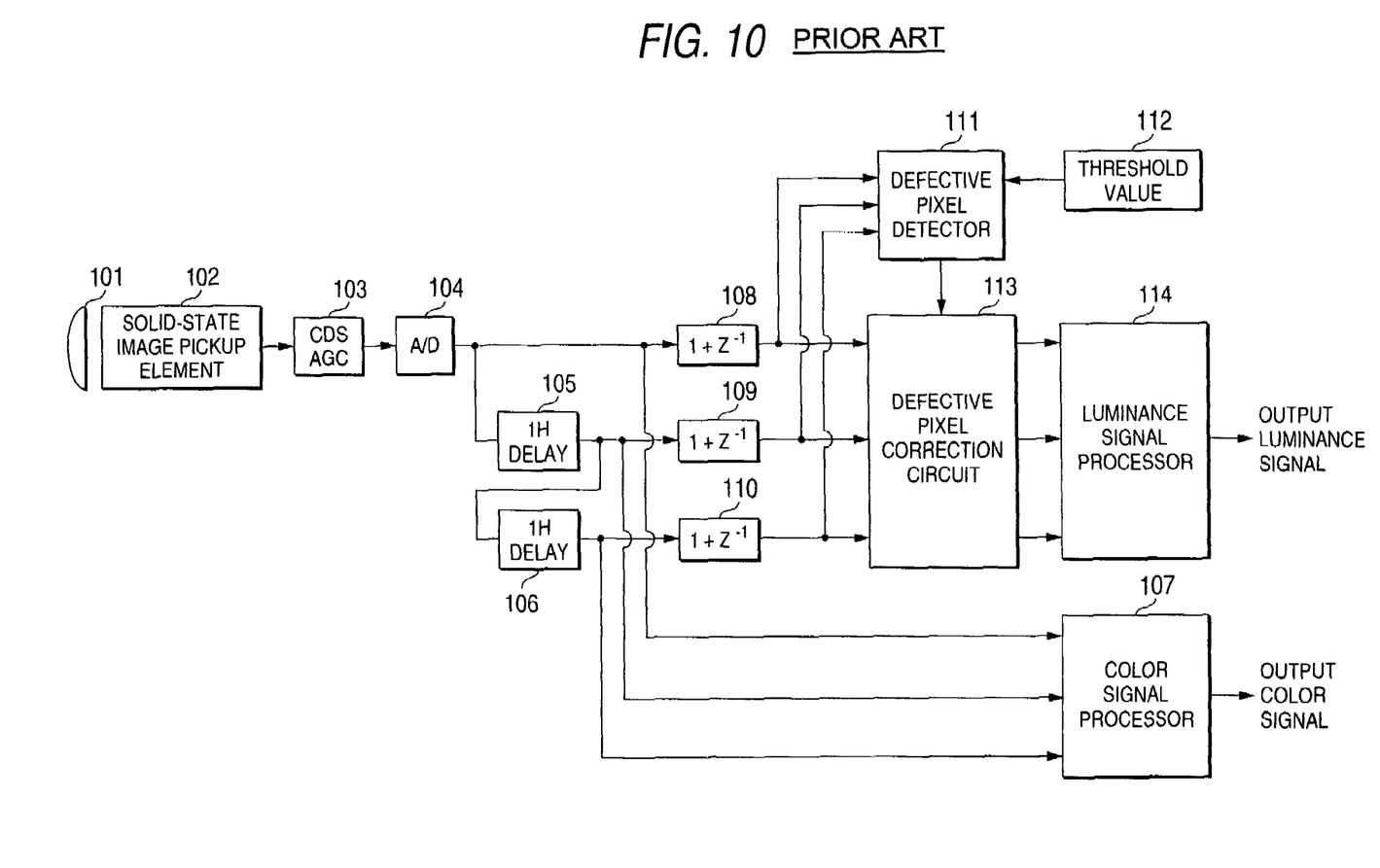
FIG. 10 is a diagram showing the configuration of a conventional solid-state imaging apparatus.

FIG. 10 is a diagram showing the configuration of a conventional solid-state imaging apparatus having a defective pixel correction function, which is disclosed in Japanese Patent Publication No. Hei. 5-41868. In the conventional solid-state imaging apparatus, image data is detected through a lens 101 by a frame-reading image pickup element. The obtained image signal is pre-processed by a pre-processor 103, and the resultant signal is converted into a digital image signal by an A/D converter 104.

This digital image signal is delayed one horizontal scanning period by a 1 H delay circuit 105, and is further delayed one horizontal scanning period (the total of two horizontal scanning periods) by a 1 H delay circuit 106. The digital image signal output by the A/D converter 104, the digital image signal delayed one horizontal scanning period, and the digital image signal delayed two horizontal scanning periods are transmitted to a color signal processor 107 to generate a color signal, and are also respectively transmitted, for filtering, to digital low-pass filters 108, 109 and 110.

The three image signals that have been filtered are transmitted to a defective pixel detector 111, and to detect a defective pixel, are compared with a threshold value 112. A defective pixel correction circuit 113 receives these three filtered image signals and a defective pixel detection signal obtained by the defective pixel detector 111, corrects the pixel signal for the defective pixel, and outputs the image signal to a luminance signal processor 114, which thereafter generates a luminance signal.

The conventional defective pixel detector 111 extracts, from the image signal, pixel data for a pixel for which a determination is to be made and adjacent, peripheral pixels, and performs for these pixel data an addition/subtraction procedure or a comparison to calculate a projection value (the difference between the pixel data for the target pixel and the pixel data for the peripheral pixels). The defective pixel detector 111 then compares the projection value with the threshold value 112 to determine whether the target pixel is defective.

From among the pixel data that are read by the frame-reading solid-state image pickup element 102, the conventional solid-state imaging apparatus adds data for two vertical pixels that are output by the filters 108, 109 and 110, and also adds data for two horizontal pixels to obtain a luminance signal. Then, the defective pixel correction device employs peripheral pixel data to correct the pixel data for the pixel that is determined to be defective. Therefore, the effect produced by the defective pixel spreads to the pixel data for the peripheral pixels, and it is impossible for the defective pixel to be detected correctly and the pixel data therefor to be corrected.

SUMMARY OF THE INVENTION

It is, therefore, one objective of the present invention to provide a solid-state imaging apparatus having a defective pixel correction function that can correct the output signal for a defective pixel without spreading the effect produced by the defective pixel to a peripheral pixel.

To achieve this objective, according to the present invention, a solid-state imaging apparatus includes:

defective pixel detection unit for extracting, from a signal output by a frame-reading solid-state image pickup element, pixel data for a target pixel for which a determination is to be made and pixel data for peripheral pixels thereof, and for employing pixel data for a pixel, selected from among the peripheral pixels, in the same filter as the target pixel, to determine whether the target pixel is a defective pixel; and defective pixel correction unit for employing the pixel data for the peripheral pixels to correct pixel data for the defective pixel. Preferably, the defective pixel detection unit determines whether the target pixel is a defective pixel by using a signal level included in the pixel data.

With this configuration, the output signal of the defective pixel can be corrected without spreading the effect produced by the defective pixel to the peripheral pixels. Further, without memory being required for storing the location of the defective pixel, the solid-state image pickup element can detect the defective pixel and correct the pixel data therefor.

Further, the defective pixel detection unit determines the target pixel is a defective pixel when the pixel data for the target pixel has a difference, equal to or greater than a first threshold value, from the pixel data included in the same filter as the target pixel, selected from among the peripheral pixels; and when pixel data for a pixel, in a different filter, adjacent to and differing from the target pixel include a difference equal to or smaller than a second threshold value extracted from the pixel data for the pixel in the same filter as the adjacent pixel. With this configuration, whether the target pixel is a defective pixel or a pixel representing an edge portion of an image can be easily determined.

Furthermore, to determine whether a difference equal to or greater than the first threshold value is present, the defective pixel detection unit compares the pixel data for the target pixel and for the pixel, one of the peripheral pixels in the same filter, that has the maximum pixel data value. With this configuration, since the threshold value can be arbitrarily set in accordance with the level of the defect, the location of the detective pixel can be designated and the defective pixel can be corrected.

In addition, to determine whether a difference equal to or smaller than the second threshold value is present, the defective pixel detection unit compares the pixel data for the adjacent pixel and for the pixel in the same filter having, at the least, the second maximum pixel data value. With this configuration, an arbitrary threshold value can be set in accordance with the level of a defect, and it is possible to determine whether the pixel data for a pixel adjacent to the defective pixel can be projected beyond the periphery.

When it is ascertained that the target pixel is defective, the defective pixel correction unit corrects the pixel data for the target pixel by using the pixel data for the target pixel and the pixel data for the pixel, in the same filter as the target pixel, selected from among the peripheral pixels. With this configuration, since the defective pixel is corrected to a level near that of the peripheral pixel, the pixel data for the defective pixel can be less noticeable in any type of object.

moreover, when it is ascertained that the target pixel is a defective pixel, the defective pixel correction unit corrects the pixel data for the target pixel by using a difference between the pixel data for the target pixel and the pixel data for the pixel, in the same filter as the target pixel, selected from among the peripheral pixels, and a difference between the pixel data for the pixel, in a different filter, selected from among the peripheral pixels and the pixel data for the adjacent pixel. With this configuration, when the projection values of the target pixel and the adjacent pixel are near that of the threshold value, the correction value can be smoothly changed in accordance with the obtained projection values, and the flickering of the defective pixel due to an adverse affect, such as noise, can be reduced.

Also, the detective pixel determination process performed by the defective pixel detection unit and the correction process performed by the defective pixel correction unit are preformed at the same time for pixels along multiple vertical lines. With this configuration, defective pixels can be detected and corrected for all the input signals used by the luminance signal processor and the color signal processor.

DETAILED DESCRIPTION OF THE PREFERRED EMBODIMENT

One embodiment of the present invention will now be described while referring to the drawings.

Figure 1:
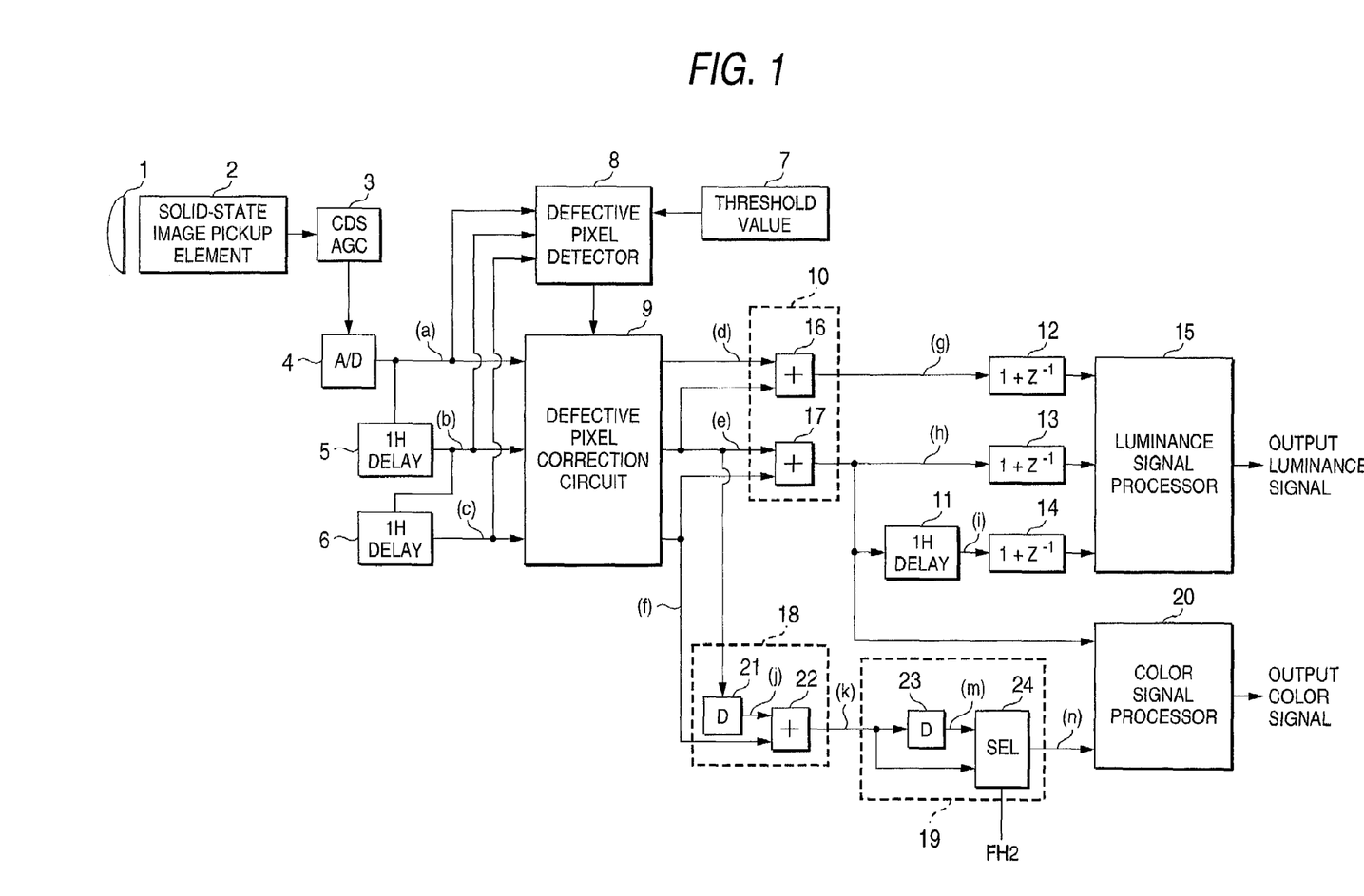
FIG. 1 is a diagram showing the configuration of a solid-state imaging apparatus according to one embodiment of the present invention.

FIG. 1 is a diagram showing the configuration of a solid-state imaging apparatus according to the embodiment of the present invention. This solid-state imaging apparatus includes: a lens 1; a frame-reading solid-state image pickup element (hereinafter referred to simply as a "solid-state image pickup element") that is located at the point of focus of the lens 1; a pre-processor 3 for pre-processing the output signal of the solid-state image pickup element 2 (this pre-processor includes a CDS (Correlated Double Sampling) circuit for sampling a signal and holding the sampled signal and an AGC (Automatic Gain Control) circuit for providing automatic gain control); and an A/D converter 4 for converting into a digital signal an analog signal output by the pre-processor 3.

The solid-state imaging apparatus further includes; a 1 H delay circuit 5 for delaying the A/D converter 4 output signal (hereinafter referred to as a signal (a)); a 1 H delay circuit 6 for delaying, for one horizontal scanning period, the output signal (hereinafter referred to as a signal (b)) of the 1 H delay circuit 5 (the output signal of the 1 H delay circuit 6 is referred to as a signal (c)); a defective pixel detector 8 for receiving the signals (a), (b) and (c) and detecting a defective pixel in a manner that will be described later; and a defective pixel correction circuit 9 for receiving the detection results of the defective pixel detector 8 and the signals (a), (b) and (c) and correcting the output signal of a defective pixel in a the manner that will be described later.

The defective pixel correction circuit 9 outputs signals (d), (e) and (f) The signal (d) is a signal obtained by correcting the pixel data for a defective pixel in the signal (a) (when no defective pixel has been detected, the signal (d) is the same as the signal (a)). As well as the signal (d), the signals (e) and (f) are signals obtained by correcting the signals (b) and (c)

In order to generate luminance signals using the signals (d), (e) and (f), the solid-state imaging apparatus for this embodiment includes an addition circuit 10, a 1 H delay circuit 11, three digital low-pass filters 12, 13 and 14, and a luminance signal processor 15.

The addition circuit 10 includes an adder 16 for adding the signals (d) and (e) and outputting a signal (g); and an adder 17 for adding the signals (e) and (f) and outputting a signal (h). The 1 H delay circuit 11 receives the signal (h) and outputs a signal (i) delayed one horizontal scanning period, and the low-pass filters 12, 13 and 14 respectively receive the signals (g), (h) and (i), and output the filtered signals to the luminance signal processor 15. The luminance signal processor 15 fetches the output signals of the three low-pass filters 12, 13 and 14, and generates and outputs the luminance signal.

In order to generate a color signal using the signals (e), (f) and (h), the solid-state imaging apparatus according to the embodiment includes an addition circuit 18, a delay adjustment circuit 19 and a color signal processor 20. The addition circuit 18 includes delay unit 21 for outputting a signal (j), obtained by delaying the signal (e); and an adder 22 for adding the signals (j) and (f) and outputting a signal (k).

The delay adjustment circuit 19 includes delay unit 23 for outputting a signal (m), obtained by delaying the signal (k); and a selector 24 for selecting either the signal (m) or the signal (k) and outputting the selected signal to a signal (n). The color signal processor 20 fetches the signal (n) and the output signal (h) that the addition circuit 10 obtains by adding the signals (e) and (f), and generates and outputs a color signal.

Figure 2:
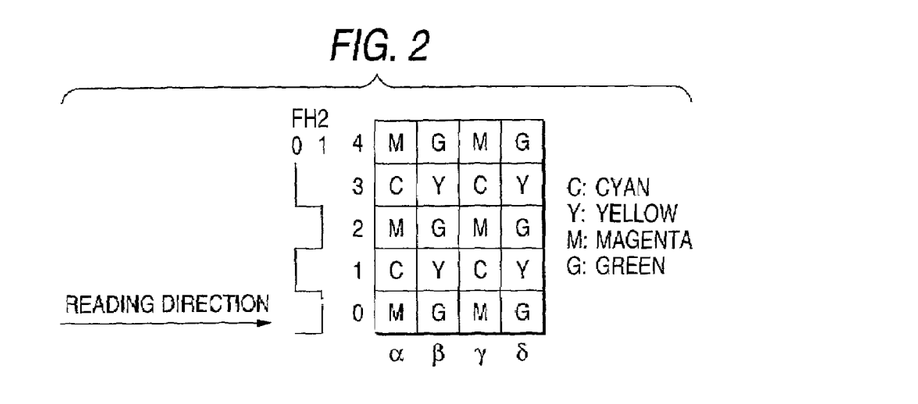
FIG. 2 is a diagram showing an example color filter arrangement for a solid-state image pickup element used by the solid-state imaging apparatus according to the embodiment of the present invention.

The entire operation of the solid-state imaging apparatus will now be described, FIG. 2 is a diagram for explaining the solid-state image pickup element 2. In this embodiment, the solid-state image pickup element 2 picks up an image by passing the light from individual pixels through yellow (Ye), magenta (Mg), cyan (Cy) and green (G) color filters. When the light from the pixels is passed through the color filters in FIG. 2, the signals (a), (b) and (c) in FIG. 1 are changed to those shown in FIG. 3. That is, when data on the third line is output by the solid-state image pickup element 2, the signal (a) is the one wherein cyan (Cy), yellow (Ye), cyan (Cy), yellow (Ye), . . . pixel data are arranged, while the signal (b), which is delayed one horizontal scanning period, is the one wherein magenta (Mg), green (G), magenta (Mg), green (G), . . . pixel data are arranged.

Figure 3:
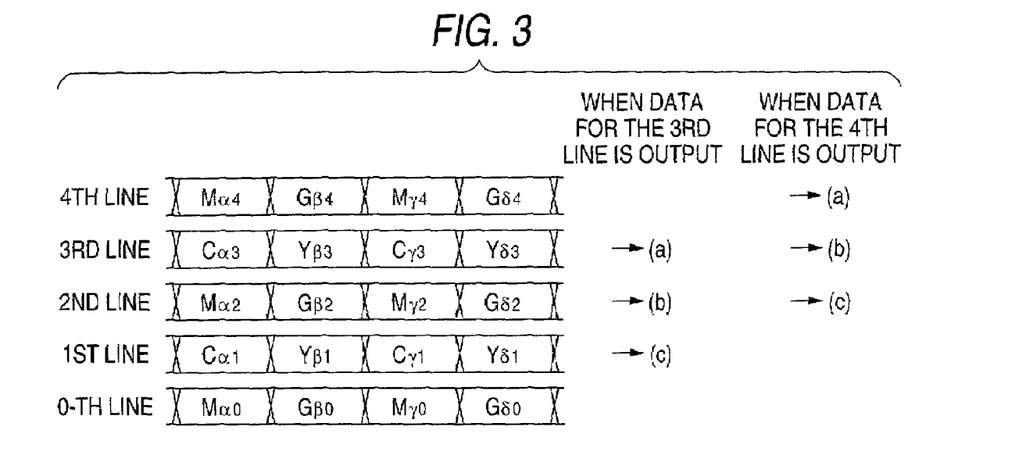
FIG. 3 is a diagram showing the output signal of the solid-state image pickup element used for the solid-state imaging apparatus according to the embodiment of the invention.
Figure 4:
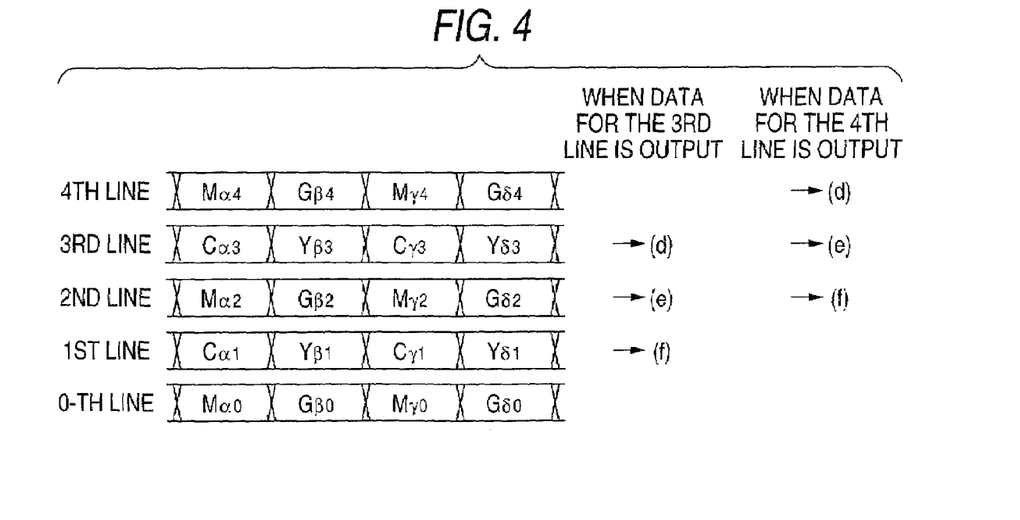
FIG. 4 is a diagram showing the output signal of a defective pixel correction circuit used by the solid-state imaging apparatus according to the embodiment of the invention.

When a defective pixel is not present in the signals (d), (e) and (f) output by the defective pixel correction circuit 9, these signals, as is shown in FIG. 4, are the same as those in FIG. 3. The addition circuit 10 adds the signals (d) and (e), or adds the signals (e) and (f), and generates and outputs signals (Cy+Mg) and (Ye+G), which are required to generate luminance signal $Y=\{(Cy+Mg)+(Ye+G)\}\times 1;2$.

Figure 5A:
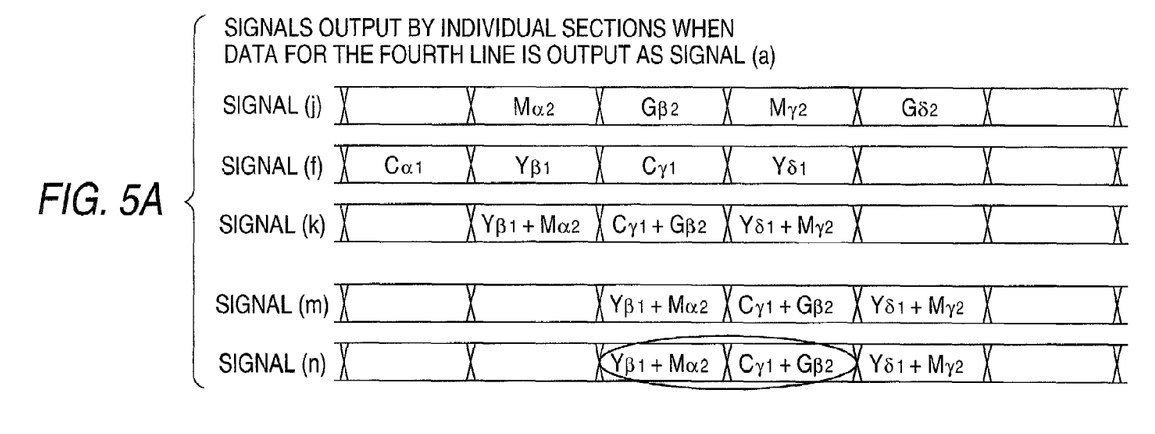
FIGS. 5A and 5B are diagrams showing output signals of the individual sections of the solid-state imaging apparatus according to the embodiment of the invention.
Figure 5B:
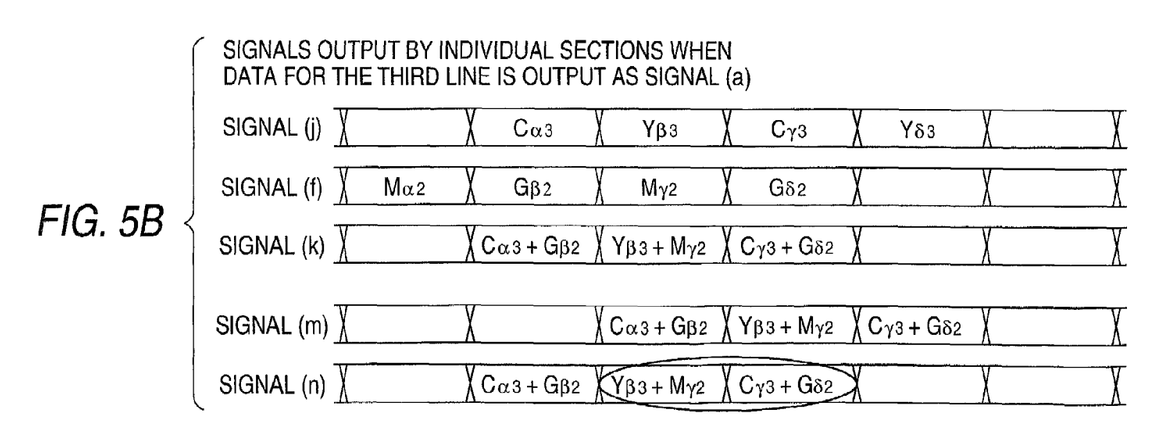

As is shown in FIGS. 5A and 5B, the addition circuit 18 employs the signals (j) and (f) to generate the signal (k), i.e., the signals (Mg+Ye) and (G+Cy) that are required to generate one color difference signal R−Y.

In accordance with a line selection signal FH2 (see FIG. 2), the delay adjustment circuit 19 switches the selector 24 to select as the signal (n) either the signal (k) or the signal (m), which is obtained by delaying the signal (k). Since for each line, the (Ye+Mg) and the (Cy+G) in the signal, (k) are exchanged, the selector 24 is switched in accordance with the line selection signal FH2, the high level and the low level of which are repeated for every horizontal scanning period.

Since signals for three lines are required by the luminance signal processor 15 at a time of generating a vertical contour emphasis signal, the 1 H delay circuit 11 delays the signal (h) one horizontal scanning period to generate a signal (i), and transmits the signal (i), together with the signals (g) and (h), to the luminance signal processor 15.

The luminance signal processor 15 fetches the luminance signals for three lines, i.e., the signals output by the low-pass filters 12, 13 and 14, performs for these output signals a gamma correction and a gain adjustment and adds horizontal and vertical contour emphasis signals, and outputs the thus obtained signal as a luminance signal Y.

The color signal processor 20 employs the signal (n) output by the delay adjustment circuit 24 and the signal (n) output by the addition circuit 10 to generate a color difference signal (R−Y, E−Y) based on the following equations.

$R-Y=(Mg+Ye)-(G+Cy)$ $B-Y=(Mg+Cy)-(G+Ye)$

The color signal processor 20 alternately outputs color signals (R−Y) and (B−Y).

An explanation will now be given for a case wherein a defective pixel is present in the solid-state image pickup element 2. When a defective pixel is present, the image defect is manifested in a luminance signal as either a white dot or a black dot. A method for detecting a defective pixel manifested as a white dot will now be described while referring to FIG. 6.

Figure 6:
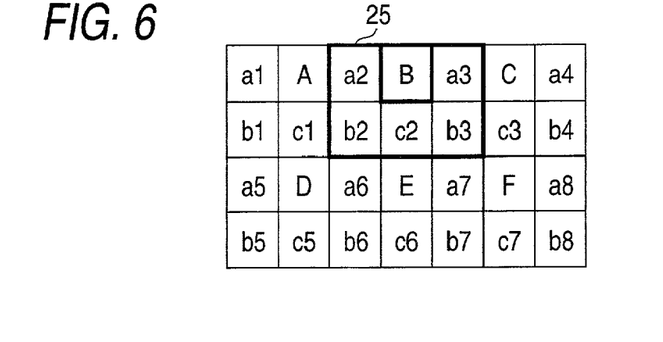
FIG. 6 is a diagram showing an area for detecting a defective pixel according to the embodiment of the invention.

As is shown in FIG. 6, the defective pixel detector 8 extracts a pixel B for which a determination is to be made, and the pixels A, C, D, E and F in the same filter as and around the periphery of B, and further extracts pixels in different filters that are adjacent to pixel B, i.e., the pixels a2, a3, b2, b3 and c2 in a frame 25, and peripheral pixels a1 to a8, b1 to b5 and c1 to c7 except for those in the frame 25, that are in different filters. The data output for these extracted pixels are then employed to determine whether the pixel B is a defective pixel.

First, in order to examine how far the pixel B is projected beyond the peripheral pixels, the difference between the pixel B and the maximum value of the peripheral pixels A, C, D, E and F in the same filter is calculated. When the difference is equal to or greater than a predetermined threshold value thw1, it is ascertained that the pixel B is the projected pixel. This determination process can be represented by determination expression 1

[Determination of the Projection Distance of a Target Pixel to be Determined]

$|B-\max(A, C, D, E, F)|\geq thw1$      (determination expression 1)

wherein the "w" in thw1 denotes white. This determination expression is defined as a first condition wherein the pixel B is a defective pixel.

Following this, the distance is examined whereat pixels in different filters adjacent to the target pixel b, i.e., the pixels a2, a3, b2, b3 and c2 in the frame 25, are projected beyond the peripheral pixels. As an example, the distance whereat the pixel a2 is projected is obtained by calculating a difference between the pixel a2 and a pixel having other than the maximum value, such as the pixel having the second maximum value, selected from among the pixels in different filters, pixels a1, a3, a5, a6 and a7, around the periphery of the pixel a2. When the difference is equal to or smaller than a predetermined threshold value thw2, it is ascertained that the pixel a2 is not projected.

For the other pixels a3, b2, b3 and c2, the projection distance is examined in the same manner, and a second condition is defined as one wherein none of the pixels a2, a3, b2, b3 and c2 in the frame 25 is projected.

This second condition is represented by the following determination expression.

[Determination of a Distance Whereat an Adjacent Pixel is Projected]

$\{|a2-\max2(a1, a3, a5, a6, a7)|\leq thw2\}$ &

$\{|a3-\max2(a2, a4, a6, a7, a3)|\leq thw2\}$ &

$\{|b2-\max2(b1, b3, b5, b6, b7)|\leq thw2\}$ &

$\{|c2-\max2(c1, c3, c5, c6, c7)|\leq thw2\}$ &

$\{|b3-\max2(b1, b3, b5, b6, b7)|\leq thw2\}$ (determination expression 2)

wherein, among the pixels in parenthesis, max2 ( ) denotes the pixel having the second maximum value.

When the first condition and the second condition are established, i.e., when determination expression 1 and determination expression 2 are both true, that is,

[Determination of a Defective Pixel]

(determination expression 1)∩(determination expression 32)=true      (determination expression 3)

is established, it is ascertained that the target pixel B is a defective pixel, and the output data for the pixel B is corrected as will be described later.

For the determination of a defective pixel, it is difficult to ascertain whether the target pixel is a defective pixel or a pixel representing an edge (contour) in the image data. According to the defective pixel detection method employed for this embodiment, when "the target pixel is projected" and "no pixels adjacent to the target pixel are projected", using determination expression 3 it is ascertained that the target pixel is a defective pixel. Therefore, it is easy to ascertain whether the target pixel is one representing a part of the edge, or is a defective pixel. This will be discussed while referring to FIGS. 7A and 7B.

Figure 7A:
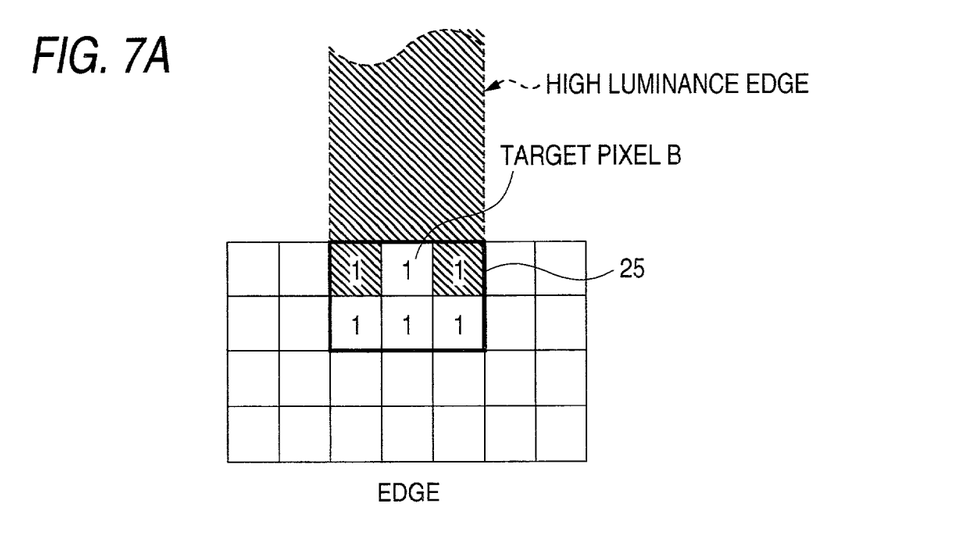
FIGS. 7A and 7B are diagrams for explaining a defective pixel detection method according to the embodiment of the invention.
Figure 7B:
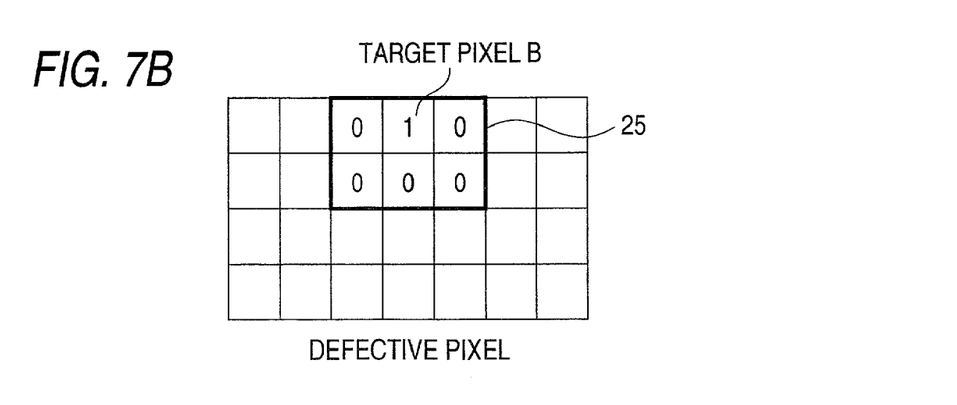

FIG. 7A is a diagram showing the states of pixels in the edge portion of the image data, and FIG. 7B is a diagram showing the states of defective pixels. Pixels represented by "1s" are those it has been determined, in accordance with the first and second conditions, are projected.

In FIG. 7A, since, for the edge portion, projected pixels (pixels represented by "1s") are present among the "pixels adjacent to the target pixels", it is not ascertained that the target pixel is a defective pixel even when it is projected. However, when the target pixel is isolated and projected as is shown in FIG. 7B, it can be ascertained, in accordance with determination expression 3, that the target pixel is a defective pixel, and the defective pixel can be easily distinguished from a pixel representing the outer portion of the edge.

A method for correcting pixel data for a defective pixel will now be described. In this embodiment, the data value for the target pixel and the data for the peripheral pixels in the same filter are employed to correct the data for a defective pixel. While referring to FIG. 6, when it is ascertained that the target pixel is a defect, the correction value for the pixel B is obtained by correction equation 1.

correction value=$k \times \max(A, C, D, E, F) + (1-k) \times B$ (correction equation 1)

In this equation, k denotes a coefficient ($0 \leq k \leq 1$) that is determined by using the projection distance of the target pixel B and the projection distance of a pixel (pixel in the frame 25) adjacent to the target pixel B. Hereinafter this coefficient is referred to as a correction coefficient.

Figure 8A:
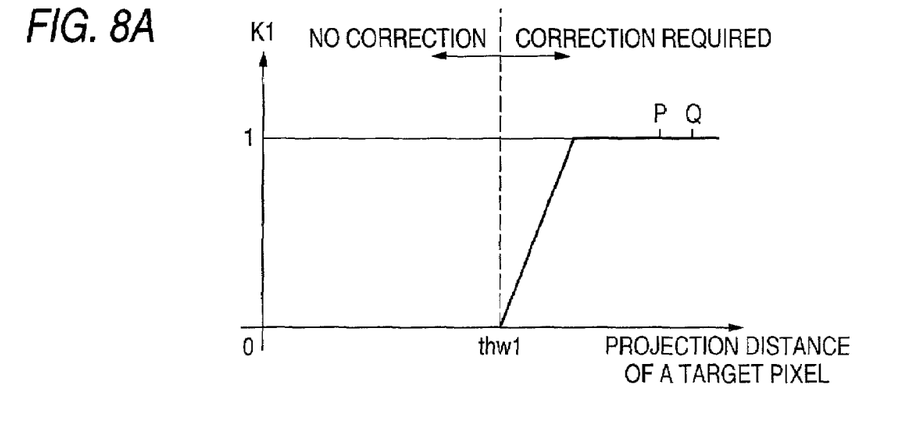
FIG. 8A is a graph showing the relationship between the projection distance of a target pixel and a correction coefficient k1 for the defective pixel correction performed according to the embodiment of the invention.
Figure 8B:
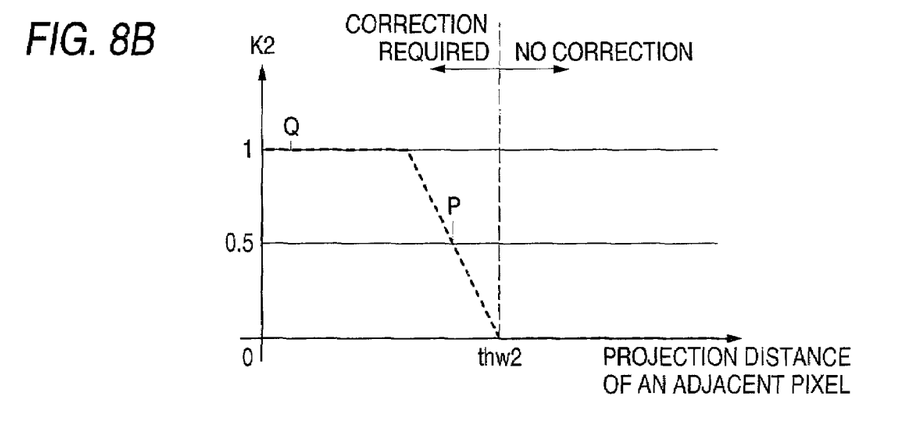
FIG. 8B is a graph showing the relationship between the projection distance of a target pixel and a correction coefficient k2 for the defective pixel correction performed according to the embodiment of the invention.

FIGS. 8A and 8B are graphs showing the characteristics of coefficients k1 ($0 \leq k1 \leq 1$) and k2 ($0 \leq k2 \leq 1$) that are changed in consonance with the projection distance of the target pixel and the projection distance of a pixel adjacent to the target pixel that are represented along the horizontal axes. The relationship between these coefficients k1 and k2 and the correction coefficient k in correction equation 1 is as follows.

$k = \min(k1, k2)$ (correction equation 2)

In FIGS. 8A and 8B, point P represents a case wherein the projection distance of the target pixel is greater than the threshold value thw1, and the projection distance of the adjacent pixel is near the threshold value thw2. At this time, k1=1 and k2=0.5, and according to correction equation 2, the correction coefficient is k=0.5.

Therefore, the correction value of the data for the defective pixel B is obtained by substituting k into correction equation 1 correction value=$0.5 \times \max(A, C, D, E, F) + 0.5 \times B$, and the data is corrected by using the intermediate value between the maximum value of the peripheral pixel and the value of the target pixel B.

In FIGS. 8A and 8B, point Q represents a case wherein the projection distance of the target pixel is greater than the threshold value thw1, and further, the projection distance of an adjacent pixel is smaller than the threshold value thw2. At this time, k1=1 and k2=1 and according to correction equation 2, the correction coefficient is k=1.

Therefore, the correction value of the data for the defective pixel B is obtained, in this case, by substituting k into correction equation 1 correction value=$1 \times \max(A, C, D, E, F) + 0 \times B$, and the data is corrected by using the maximum value of the peripheral pixel.

As is described in the embodiment, when the projection values of the target pixel and the adjacent pixels are near the threshold values, the solid-state imaging apparatus smoothly changes the data correction value in accordance with the projection distances. Thus, when due to noise the projection distance of the target pixel or the adjacent pixel exceeds the threshold value, and the condition for the defect correction is repetitively established and unestablished, the blinking of a defective pixel, i.e., the blinking of a white pixel in this case, can be reduced.

The method for detecting a white defective pixel and the method for correcting image data have been explained. The same principle can be used for the detection and the correction performed for a black defective pixel. The expressions corresponding to determination expressions 1, 2 and 3 and to correction equations 1 and 2 are shown below.

[Determination of the Projection Distance for a Target Pixel]

$|B - \min(A, C, D, E, F)| \geq \text{thb1}$ (determination expression 1b)

wherein black is denoted by the "b" in "thb".

[Determination of the Projection Distance for an Adjacent Pixel]

$\{|a1 - \min2(a1, a3, a5, a6, a7)| \leq \text{thb2}\}$ &

$\{|a3 - \min2(a2, a4, a6, a7, a8)| \leq \text{thb2}\}$ &

$\{|b2 - \min2(b1, b3, b5, b6, b7)| \leq \text{thb2}\}$ &

$\{|c2 - \min2(c1, c3, c5, c6, c7)| \leq \text{thb2}\}$ &

$\{|b3 - \min2(b1, b3, b5, b6, b7)| \leq \text{thb2}\}$ (determination expression 2b)

wherein, among the pixels in parenthesis, min2 ( ) represents a pixel having the second maximum value.

[Determination of a Defective Pixel]

(determination expression 1b)∩(determination expression 2b)=true (determination expression 3b)

[Data Correction for a Defective Pixel]

correction value=$k \times \min(A, C, D, E, F) + (1-k) \times B$ (correction equation 1b)

[Correction for a Correction Coefficient]

$k = \min(k1, k2)$ (correction equation 2b)

Figure 9:
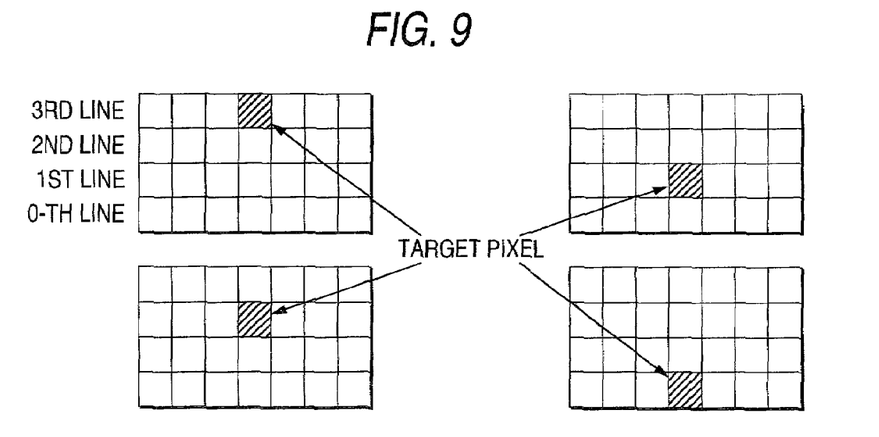
FIG. 9 is a diagram showing target pixels for which the detection and correction of a defective pixel can be performed at the same time according to the embodiment of the present invention.

According to the solid-state imaging apparatus of the embodiment, since the defective pixel detector 8 fetches pixel data for multiple lines at the same time, and since the defective pixel correction circuit 9 fetches pixel data for multiple lines at the same time, the defective pixel determination process and the correction process can be performed at the same time, in parallel, for the individual target pixels for multiple vertically arranged lines in FIG. 9. Thus, for all the input signals used by the luminance signal processor and the color signal processor, defective pixels can be detected and corrected.

In this embodiment, since for the correction of data, a defective pixel determination is performed upon the reception of each image signal (pixel data) that is sequentially transmitted by the solid-state image pickup element 2, memory for storing the location of a defective pixel is not required. Thus, manufacturing costs can be reduced, and when the failure of a new pixel occurs during the operation of the solid-state imaging apparatus, this failure can be coped with immediately.

According to the invention, the output signal of a defective pixel can be corrected, while an adverse affect, attributable to the defective pixel, is prevented from spreading to peripheral pixels. Therefore, even when a defective image is included in the solid-state image pickup element, a clear and natural image, wherein no defective pixel is present, can be supplied for display on a screen.

What is claimed is:

1. A solid-state imaging apparatus, comprising:
a frame-reading solidstate image pickup element for outputting an image signal, the image signal including a target pixel having first pixel data, a first peripheral pixel that is not adjacent to the target pixel and has second pixel data, a first adjacent pixel that is adjacent to the target pixel and has third pixel data, and an additional pixel that is either adjacent to the target pixel or not adjacent to the target pixel and has fourth pixel data;
a first filter containing the target pixel and the first peripheral pixel;
a second filter containing the first adjacent pixel and the additional pixel;
a defective pixel detector for extracting the first pixel data, the second pixel data, the third pixel data, and the fourth pixel data and determining that the target pixel is defective if both of a difference between the first pixel data and the second pixel data is greater than or equal to a first threshold value and a difference between the third pixel data and the fourth pixel data is less than or equal to a second threshold value, wherein a determination that the target pixel is defective is based on both of said differences; and
a defective pixel correction unit for correcting the first pixel data based on the second pixel data.

2. The solid-state imaging apparatus as claimed in claim 1, wherein said defective pixel detector determines that said target pixel is defective by using signal levels included in said first pixel data, in said second pixel data, in said third pixel data, and in said fourth pixel data.

3. The solid-state imaging apparatus of claim 1, wherein the defective pixel correction unit replaces the first pixel data with the second pixel data.

4. A solid-state imaging apparatus, comprising:
a frame-reading solid-state image pickup element for outputting an image signal, the image signal including a plurality of data-containing pixels, the pixels including a target pixel, a first plurality of peripheral pixels that are not adjacent to the target pixel, a second plurality of peripheral pixels that are not adjacent to the target pixel, and a plurality of adjacent pixels that are adjacent to the target pixel;
a first filter containing the target pixel and the first plurality of peripheral pixels;
a second filter containing the second plurality of peripheral pixels and the plurality of adjacent pixels; and
a defective pixel detector for extracting data from the target pixel, the first plurality of peripheral pixels, the second plurality of peripheral pixels and the plurality of adjacent pixels and determining that the target pixel is defective if both of a difference between the data extracted from the target pixel and the data extracted from the first plurality of peripheral pixels is greater than or equal to a first threshold value and a difference between the data extracted from an adjacent pixel and the data extracted from other adjacent pixels or the second plurality of peripheral pixels is less than or equal to a second threshold value, wherein a determination that the target pixel is defective is based on both of said differences.

5. The solid-state imaging apparatus as claimed in claim 4, wherein the difference between the data extracted from said target pixel and said first plurality of peripheral pixels is based on a maximum data value extracted from said first plurality of peripheral pixels.

6. The solid-state imaging apparatus as claimed in claim 4, wherein the difference between the data extracted from said adjacent pixel and the data extracted from other adjacent pixels or said second plurality of peripheral pixels is based on a data value that is at least a second maximum.

7. The solid-state imaging apparatus of claim 4, wherein the difference between the data extracted from the adjacent pixel and the data extracted from other adjacent pixels or the second plurality of peripheral pixels is based on a data value that is less than a maximum.

8. The solid-state imaging apparatus of claim 7, wherein the difference between the data extracted from the adjacent pixel and the data extracted from other adjacent pixels or the second plurality of peripheral pixels is based on a data value that is a second maximum.

9. The solid-state imaging apparatus of claim 4, further comprising a defective pixel correction unit for correcting the target pixel.

10. The solid-state imaging apparatus as claimed in claim 9, wherein said target pixel is defective, and further wherein said defective pixel correction unit corrects said target pixel based on the data extracted from said target pixel and the data extracted from said first plurality of peripheral pixels.

11. The solid-state imaging apparatus as claimed in claim 9, wherein the defective pixel determination process performed by said defective pixel detector and the correction process performed by said defective pixel correction unit are performed at the same time for pixels along multiple vertical lines.

12. The solid-state imaging apparatus of claim 9, wherein the target pixel is defective, and further wherein the defective pixel correction unit corrects the target pixel based on both of the difference between the data extracted from the target pixel and the data extracted from the first plurality of peripheral pixels and the difference between the data extracted from the adjacent pixel and the data extracted from other adjacent pixels or the second plurality of peripheral pixels.

* * * * *